Sept. 22, 1925. 1,554,533
C. D. STEPHENS
HEADLIGHT AND FRONT FENDER SUPPORT
Filed Jan. 9, 1924    2 Sheets-Sheet 2
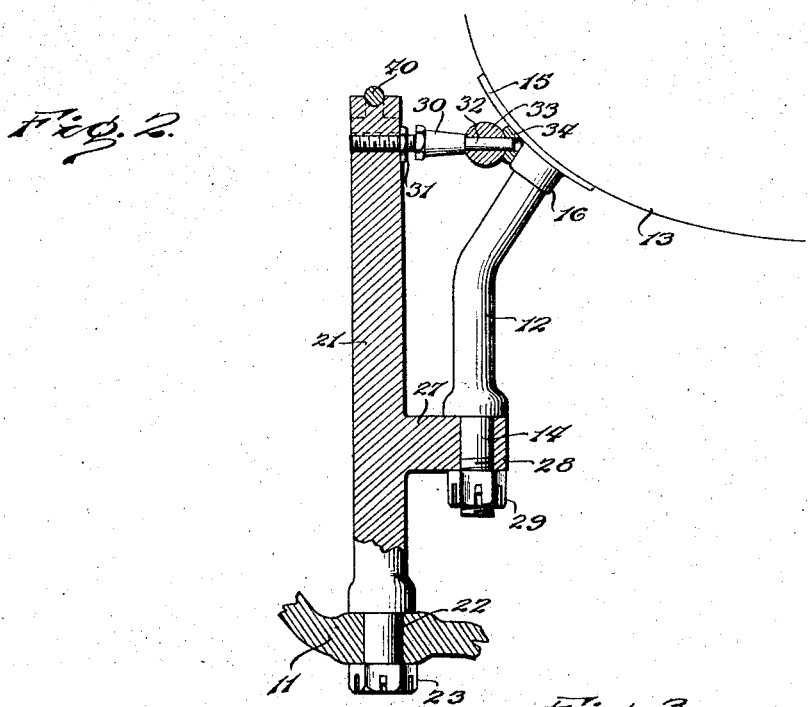
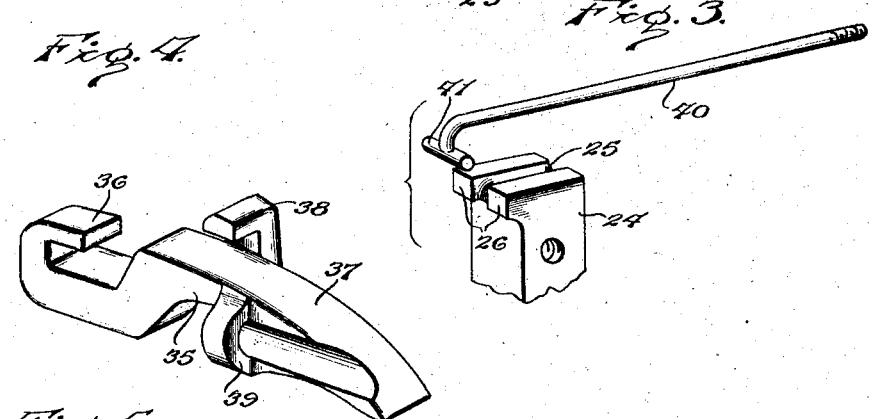
Inventor
Charles D. Stephens
By
Attorneys Patented Sept. 22, 1925.

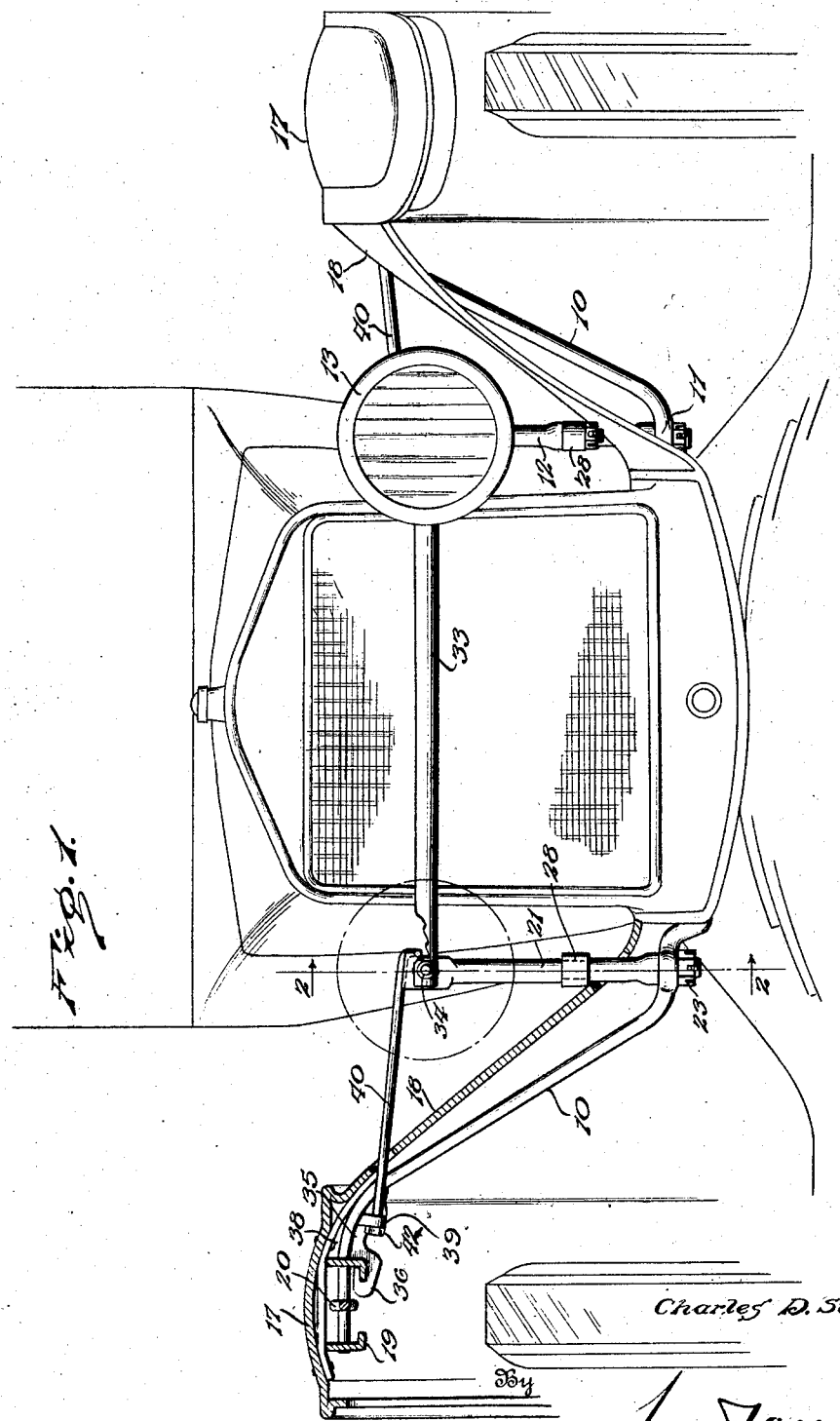

1,554,533

UNITED STATES PATENT OFFICE.

CHARLES D. STEPHENS, OF SAN ANTONIO, TEXAS, ASSIGNOR OF ONE-HALF TO THOMAS E. NELSON, OF ROUNDROCK, TEXAS.

HEADLIGHT AND FRONT-FENDER SUPPORT.

Application filed January 9, 1924. Serial No. 685,283.

*To all whom it may concern:*

Be it known that I, CHARLES D. STEPHENS, citizen of the United States, residing at San Antonio, in the county of Bexar and State of Texas, have invented certain new and useful Improvements in Headlight and Front-Fender Supports, of which the following is a specification.

This invention relates to an improved headlight and front fender support for Ford motor vehicles and seeks, among other objects, to provide an effective and dependable means for stabilizing the headlights and front fenders and reducing vibration of these parts to a minimum.

The invention seeks as a further object, to provide a support adapted to sustain the headlights slightly elevated above their normal position and thus effect an increase in the utility of the headlights.

And the invention seeks, as a still further object, to provide a support which may be easily and quickly installed.

Other and incidental objects will appear hereinafter.

In the drawings:

Figure 1 is a front elevation showing my improved device applied, parts being broken away and illustrated in section, Figure 2 is a detail sectional view through one of the lamp supporting posts of the device, Figure 3 is a detail perspective view showing the upper end of one of said supporting posts, Figure 4 is a detail perspective view showing one of the anchoring members for the tie rods of the device, and Figure 5 is a detail view of one of the saddle plates employed.

Referring now more particularly to the drawings, I have, for convenience, shown my improved device in connection with a Ford vehicle, the usual front fender brackets of which are indicated at 10. Near their lower ends, these brackets are provided with eyes 11 which, under present practice, mount the brackets 12 of the headlights 13 of the vehicle. At their lower ends, the brackets 12 are provided with studs 14 to fit through said eyes and secured to the casings of the headlights are plates 15 carrying sockets 16 which receive the upper ends of the brackets. The front fenders of the vehicle are indicated at 17 and the fender aprons at 18. Secured to the fenders therebeneath are saddle plates or clips 19 accommodating the upper ends of the brackets 10 and coacting between said brackets and plates are eye bolts 20 clamping the fenders to the brackets. All of this structure so for as described, is standard and need not, therefore, be further taken up in detail.

Coming now more particularly to the subject of the present invention, I employ a pair of lamp supporting posts 21 which are provided at their lower ends with studs 22 to fit through the eyes 11 of the brackets 10 so that the posts thus supplant the headlight brackets 12 and threaded upon said studs are nuts 23 securing the posts in position upstanding from the brackets in parallel relation. At their upper ends, the posts are, as shown in detail in Figure 3, slightly enlarged to form heads 24 each provided at its upper terminal with a transverse groove 25 and formed on each of said heads at opposite sides of the groove therein is a pair of overhanging lugs 26, the pairs of lugs being arranged at the upper ends of the confronting faces of the heads. Projecting forwardly from the posts near their lower ends are arms 27 terminating in eyes 28 of a diameter to receive the studs 14 of the lamp brackets 12 and threaded upon said studs are nuts 29 securing the brackets upon the arms. Thus, as will be seen, the headlights are carried by the posts 21 and are elevated somewhat above their usual position when mounted directly upon the brackets 10.

Screwed into the heads 24 of the posts 21 are forwardly projecting pins 30 which may be rotatably adjusted and arranged upon the pins are lock nuts 31 securing said pins in adjusted position. At their forward ends, the pins are reduced to define studs 32 and extending transversely between the pins is a cross rod 33 apertured near its ends to receive said studs therethrough. The cross rod will thus serve to rigidly connect the posts 21 with each other and mounted upon the forward ends of the studs 32 are saddle plates 34 apertured to fit over said studs. At their rear sides, the plates 34 are formed with concave faces to seat flat against the cross rod 33 while at their forward sides the plates are provided with diverging flat faces to fit, as shown in Figure 2, in the angles between the plates 15 and sockets 16 of the headlights 13, bearing flat against these parts. Thus, as will be seen, the pins 30 may be adjusted forwardly to exert a forward strain or tension upon the lamp brackets 12 and locked by means of the nuts 31 for thus rigidly binding the lamp brackets and headlights against vibration.

Associated with the plates 19 of the fenders 17 is a pair of anchoring members 35, one of which is shown in detail in Figure 4. At their forward ends, these members are formed with hooks 36 which, as shown in Figure 1, are engaged over the bottom flanges of the plates 19 while in the rear of said hooks the members are provided with convex bearing faces 37 to seat flat against the brackets 10 therebeneath at the outer bends in said brackets. Extending from the members at their rear sides are forwardly directed hooks 38 engaging over the brackets for connecting the members therewith and formed on said members at their forward sides are apertured ears 39. Extending between the posts 21 and the anchoring members 35 are tie rods 40. These rods rest in the grooves 25 in the heads 24 of said posts and at their inner ends are curved laterally and are provided with T-heads 41 to engage beneath the lugs 26 of the heads 24. At their outer ends, the rods extend freely through the ears 39 of the anchoring members and screwed upon said rods are nuts 42. Accordingly, as will be at once apparent, the nuts 42 may be adjusted for stressing the fender brackets 10 upwardly so as to eliminate vibration of the brackets and fenders while the tie rods will cooperate with the posts 21, the pins 30 and cross rod 33 to form a connection between the outer end portions of the fender brackets securing the fenders against independent movement as well as supporting a portion of the weight thereon.

Having thus described the invention, what is claimed as new is:

1. A device of the character described including in combination with fender brackets, and fenders carried thereby and provided with saddle plates, posts attached to said brackets, means extending between and connecting the posts with each other, anchoring members engaged with said saddle plates, and tie rods extending between the posts and said members cooperating with said means to form a rigid connection between the brackets.

2. A device of the character described including in combination with fender brackets, and fenders carried thereby and provided with saddle plates, posts attached to said brackets and provided at their upper ends with lugs projecting at the inner sides of the posts, means extending between and connecting the posts with each other, anchoring means engaged with said saddle plates, tie rods provided at their inner ends with heads engaged with said lugs and extending across the upper ends of the posts, and means connecting the outer ends of the rods with said members, the rods cooperating with said first mentioned means to form a rigid connection between said brackets.

3. A device of the character described including in combination with fender brackets, and fenders carried thereby and provided with saddle plates, posts for attachment to said brackets, means extending between and connecting the posts with each other, anchoring members having hooks to engage said plates as well as hooks to engage over the brackets and provided with ears, and tie rods engaged at their inner ends with said posts and connected at their outer ends with said ears cooperating with said means to form a rigid connection between the brackets.

4. A device of the character described including in combination with fender brackets, posts for attachment to said brackets, pins carried by the posts, a cross rod engaged with said pins forming a rigid connection between the posts, means to extend between the posts and the free end portions of said brackets cooperating with said rod to form a rigid connection between the brackets, and headlight saddle plates carried by said pins, the pins being adjustable upon the posts for spacing said plates with respect to the posts.

In testimony whereof I affix my signature,

CHARLES D. STEPHENS. [L. S.]